(12) United States Patent
Hikichi

(10) Patent No.: US 10,484,563 B2
(45) Date of Patent: Nov. 19, 2019

(54) IMAGE FORMING APPARATUS, AND METHOD FOR CONTROLLING IMAGE FORMING APPARATUS

(71) Applicant: CANON KABUSHIKI KAISHA, Tokyo (JP)

(72) Inventor: Atsushi Hikichi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/912,198

(22) Filed: Mar. 5, 2018

(65) Prior Publication Data

US 2018/0198940 A1 Jul. 12, 2018

Related U.S. Application Data

(63) Continuation of application No. 14/719,165, filed on May 21, 2015, now Pat. No. 9,961,223.

(30) Foreign Application Priority Data

May 23, 2014 (JP) ................... 2014-107238

(51) Int. Cl.
*H04N 1/00* (2006.01)
*B41J 29/38* (2006.01)
(Continued)

(52) U.S. Cl.
CPC .......... *H04N 1/00896* (2013.01); *B41J 29/38* (2013.01); *G03G 15/5004* (2013.01);
(Continued)

(58) Field of Classification Search
CPC .......... H04N 1/00896; H04N 1/00474; H04N 2201/0094; B41J 29/38; G03G 15/5004; G06F 1/3284; Y02D 50/20; Y02D 10/159
(Continued)

(56) References Cited

U.S. PATENT DOCUMENTS

| 5,745,247 A | * | 4/1998 | Yasui | ................. G03G 15/2003 |
| | | | | 358/296 |
| 2010/0202018 A1 | * | 8/2010 | Akiyama | ........... G03G 15/5004 |
| | | | | 358/1.15 |

(Continued)

FOREIGN PATENT DOCUMENTS

| JP | 2000295440 A | 10/2000 |
| JP | 2004222234 A | 8/2004 |
| JP | 2012168374 A | 9/2012 |

OTHER PUBLICATIONS

Bungo, JP 2012-191369, Oct. 4, 2012, Canon Inc., entire document relevent. (Year: 2012).*

*Primary Examiner* — Neil R McLean
(74) *Attorney, Agent, or Firm* — Canon U.S.A., Inc. IP Division

(57) ABSTRACT

An image forming apparatus that shifts to a power saving state, includes a printing unit, a printing control unit configured to control the printing unit, and a power supply unit configured to supply power to the printing control unit when the image forming apparatus returns from the power saving state, wherein the printing control unit, to which power is supplied by the power supply unit, executes initialization of the printing unit in a case where a printing screen for performing a printing function is set as a initial screen to be displayed when the image forming apparatus returns from the power saving state, and wherein the printing control unit does not execute initialization of the printing unit in a case where a selection screen for selecting the printing function is set as a initial screen to be displayed when the image forming apparatus returns from the power saving state.

20 Claims, 16 Drawing Sheets

(51) Int. Cl.
*G03G 15/00* (2006.01)
*G06F 1/3234* (2019.01)

(52) U.S. Cl.
CPC ....... *G06F 1/3284* (2013.01); *H04N 1/00474* (2013.01); *H04N 2201/0094* (2013.01); *Y02D 10/159* (2018.01); *Y02D 50/20* (2018.01)

(58) Field of Classification Search
USPC ........................................................ 358/1.14
See application file for complete search history.

(56) References Cited

U.S. PATENT DOCUMENTS

| | | | | |
|---|---|---|---|---|
| 2012/0182567 A1* | 7/2012 | Ono | ................... | G03G 15/5004 358/1.13 |
| 2013/0215446 A1* | 8/2013 | Imai | ..................... | H04N 1/4426 358/1.13 |

* cited by examiner

FIG.4A-A

| COPY | | | |
|---|---|---|---|
| READY TO COPY | | | |
| MONOCHROME | 100% | AUTOMATIC SHEET | COPY NUMBER  1 |

| FINISHING | TWO-SIDED | DENSITY | TYPE OF DOCUMENT |
|---|---|---|---|

FIG.4A-B

SCAN AND STORE

| BOX NUMBER | NAME |
|---|---|
| 01 | |
| 02 | |
| 03 | |
| 04 | |
| 05 | |
| 06 | |

FIG.4B-A

PRINT STORED DOCUMENT

| BOX NUMBER | NAME |
|---|---|
| 01 | |
| 02 | |
| 03 | |
| 04 | |
| 05 | |
| 06 | |

PRINT

FIG.4B-B

SCAN AND TRANSMIT

DESIGNATE ADDRESS

ADDRESS | ONE-TOUCH | NEWLY INPUT

POWER SUPPLY CONFIGURATION OF CONTROLLER

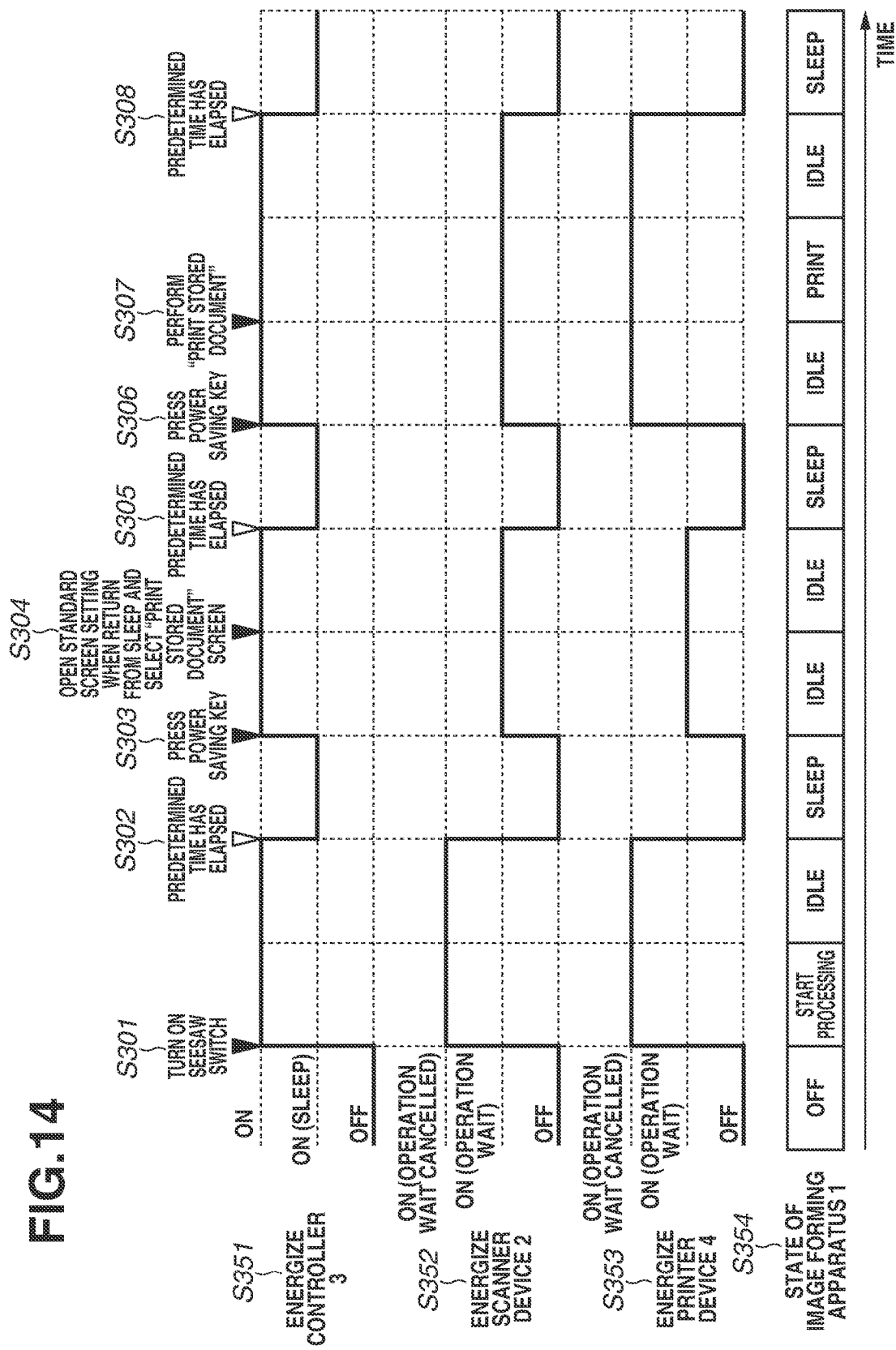

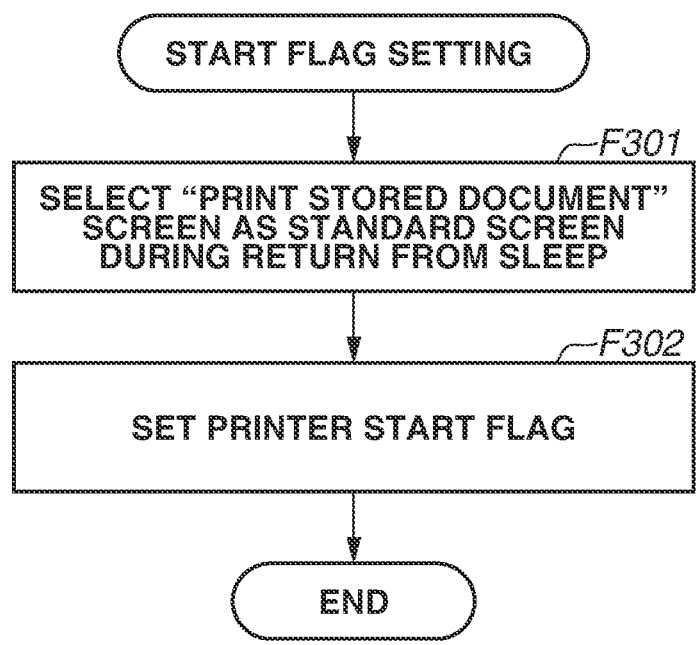

IMAGE FORMING APPARATUS, AND METHOD FOR CONTROLLING IMAGE FORMING APPARATUS

RELATED APPLICATIONS

This application is a Continuation of U.S. patent application Ser. No. 14/719,165 filed on May 21, 2015, which claims the benefit of Japanese Application No. 2014-107238 filed May 23, 2014, which are hereby incorporated by reference herein in their entirety.

BACKGROUND

Field

Aspects of the present invention generally relate to an image forming apparatus and a method for controlling the image forming apparatus.

Description of the Related Art

A method for energizing a printer device, a scanner device, and a facsimile (FAX) device in an image forming apparatus when a user is found to use the printer device, the scanner device, and the FAX device due to an improvement in power saving function has been proposed.

For example, the scanner device is energized only when a scan function is used, the printer device is energized only when a print function is used, and the FAX device is energized only when a FAX function is used. Simultaneously, boards and chips respectively related to the printer device, the scanner device, and the FAX device are energized only when used.

In a method for energizing a printer device, a scanner device, and a FAX device in an image forming apparatus when a user uses the devices, the image forming apparatus can satisfy power saving.

However, the printer device, the scanner device, and the FAX device are energized and initialized after the image forming apparatus is determined to perform processing. Thus, it takes time to perform initialization such as energization, software initialization, or hardware pre-processing. As a result, it takes time to start the printer device, the scanner device, and the FAX device, and performance of processing is delayed by the time, resulting in decreasing user's convenience.

With an improvement in silent property, a method for initializing a printer device and a scanner device in an image forming apparatus when it is found that a user is to use the printer device and the scanner device has been proposed. More specifically, the image forming apparatus energizes the printer device and the scanner device at the start and the return from sleep. However, the image forming apparatus returns in an operation wait state where it operates when it is found to use the printer device and the scanner device.

The operation wait state is a state where the printer device and the scanner device are energized but movable units are not moved. For example, respective motors or polygon mirrors in a sheet feeding unit, a sheet discharge unit, and a marking unit are not operated, and the marking unit is not temperature-adjusted. A motor in a document feeding unit is not operated, and a home position of a scanner unit is not adjusted.

On the other hand, an operation wait cancelled state is a state where the printer device and the scanner device are energized while the above-mentioned processing is performed. In the operation wait state, power is saved more than in the operation wait cancelled state by the control not to move the movable unit. In a method for initializing the printer device and the scanner device when the user uses the devices, the image forming apparatus can satisfy the silent property.

However, the printer device and the scanner device are initialized after it is determined that the image forming apparatus performs processing. Thus, it takes time to perform initialization such as hardware pre-processing, although energization and software initialization have ended. As a result, it takes time to start the printer device and the scanner device, and the execution of processing is delayed by the time, resulting in decreasing user's convenience.

Furthermore, a method for causing an image forming apparatus to return from sleep in a state where a printer device and a scanner device in the image forming apparatus are powered on when a copy screen is set as a default, although the image forming apparatus normally returns from sleep in a state where the printer device and the scanner device are powered off, has been proposed. In this method, power saving and a silent property can be satisfied. However, the printer device and the scanner device are powered on when a copy screen is not set as a default. Thus, a user attempts unsuccessfully to immediately use the image forming apparatus, thereby resulting in decreasing user's convenience.

In Japanese Patent Application Laid Open No. 2012-191369, the image forming apparatus returns from sleep in a state where a scanner driver and a printer driver are powered on, in a case where a copy screen is set as an initial screen at the time of return from sleep. However, when the copy screen is not set as the initial screen, the scanner driver and the printer driver remain not powered on.

Therefore, when the copy screen is not set as the initial screen, a user attempts unsuccessfully to immediately use the image forming apparatus, thereby resulting in decreasing user's convenience.

SUMMARY

Aspects of the present invention are generally directed to a technique for switching initialization processing for each device in an image forming apparatus according to a function of a displayed setting screen when the image forming apparatus returns from a sleep mode.

According to an aspect of the present invention, an image forming apparatus that shifts to a power saving state, includes a printing unit, a printing control unit configured to control the printing unit, and a power supply unit configured to supply power to the printing control unit when the image forming apparatus returns from the power saving state, wherein the printing control unit, to which power is supplied by the power supply unit, executes initialization of the printing unit in a case where a printing screen for performing a printing function is set as a initial screen to be displayed when the image forming apparatus returns from the power saving state, and wherein the printing control unit does not execute initialization of the printing unit in a case where a selection screen for selecting the printing function is set as a initial screen to be displayed when the image forming apparatus returns from the power saving state.

Further features of the present disclosure will become apparent from the following description of exemplary embodiments with reference to the attached drawings.

BRIEF DESCRIPTION OF THE DRAWINGS

FIGS. 4A-A and 4A-B illustrate a UI screen displayed on the LCD touch panel.

FIGS. 4B-A and 4B-B illustrate a UI screen displayed on the LCD touch panel.

FIG. 14 is a timing chart illustrating a power supplying status of the image forming apparatus.

FIG. 15 is a flowchart illustrating a method for controlling the image forming apparatus.

DESCRIPTION OF THE EMBODIMENTS

Exemplary embodiments will be described below with reference to the drawings.

<Description of System Configuration>

Figure 1:
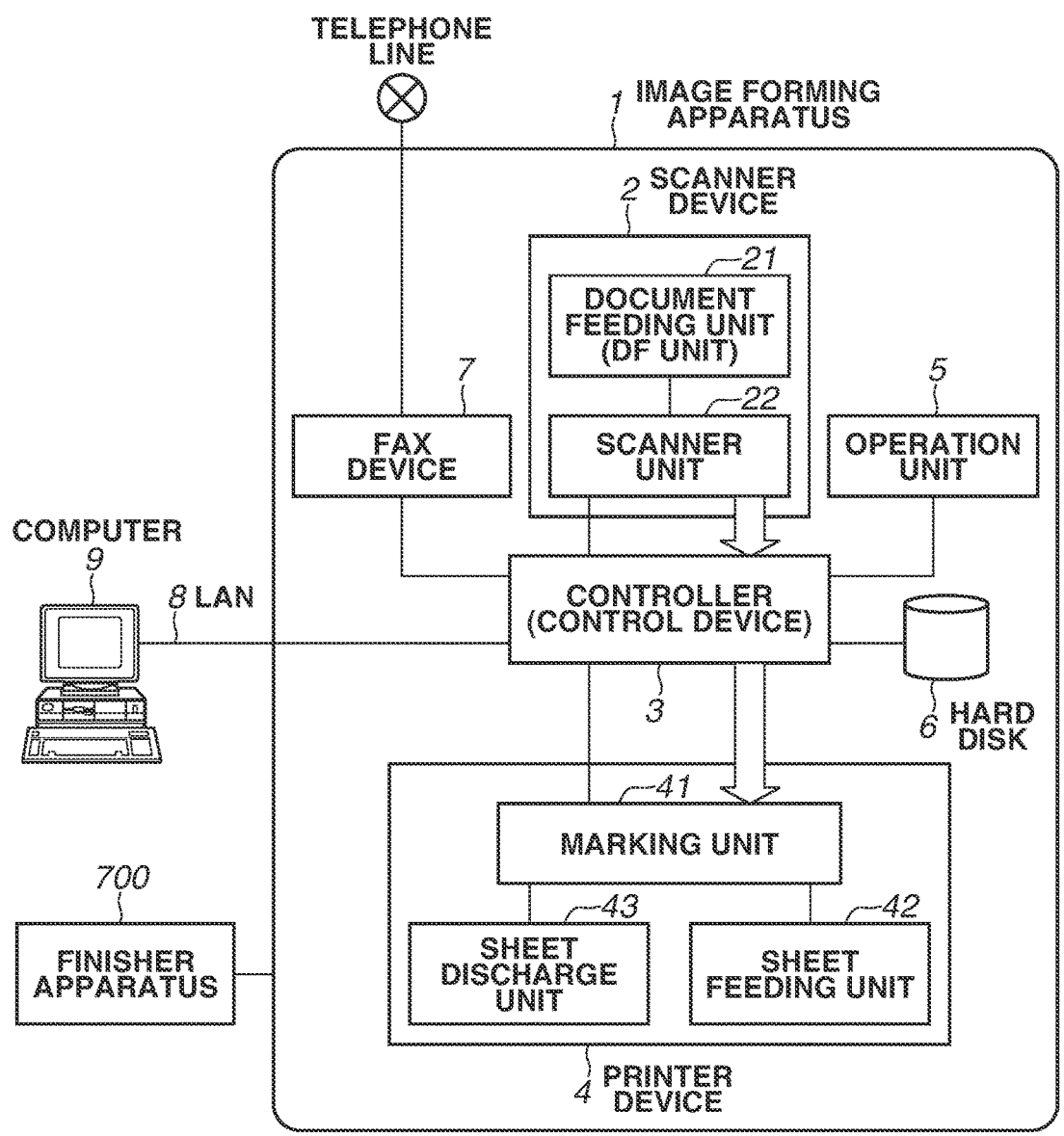
FIG. 1 is block diagram illustrating a configuration of an image forming system.

FIG. 1 is a block diagram illustrating a configuration of an image forming system according to a first exemplary embodiment. In FIG. 1, a multifunction peripheral including devices that respectively execute a print function, a scanner function, and a data communication function is taken as an example.

In FIG. 1, an image forming apparatus 1 receives a job from a computer 9 via a local area network (LAN) 8. More than one computer can be connected to the image forming apparatus 1.

A scanner device 2 optically reads an image from a document and converts the read image into a digital image. A printer device 4 outputs the digital image from the scanner device 2 to a sheet. An operation unit 5 includes a touch panel and hardware keys for receiving a setting for the image forming apparatus 1 from a user and displaying a processing status. A hard disk 6 stores, among other information, the digital image and a control program. A FAX device 7 transmits and receives the digital image to and from a telephone line. A controller 3 is connected to the scanner device 2, the printer device 4, the operation unit 5, the hard disk 6, and the FAX device 7 and issues instructions to execute a job on the image forming apparatus 1.

The image forming apparatus 1 can also input and output the digital image to and from the computer 9 via the LAN 8, and issue the job and designate a device. The scanner device 2 includes a document feeding unit 21 capable of automatically sequentially replacing a document bundle, and a scanner unit 22 capable of optically scanning a document and converting the document into a digital image. Image data obtained by the conversion is transmitted to the controller 3.

The printer device 4 includes a sheet feeding unit 42 capable of sequentially feeding sheets from a sheet bundle one by one, a marking unit 41 for printing image data on the fed sheet, and a sheet discharge unit 43 for discharging the sheet on which the image data has been printed.

A finisher apparatus 700 performs processing such as discharge, sorting, stapling, punching, and cutting, on the sheet output from the sheet discharge unit 43 in the printer device 4 in the image forming apparatus 1.

An example of various jobs that can be executed by the image forming apparatus 1 will be described below.

[Copying Function]

The image forming apparatus 1 includes a copying function for storing an image read from the scanner device 2 on the hard disk 6 and simultaneously printing the recorded image using the printer device 4.

[Image Transmission Function]

The image forming apparatus 1 includes an image transmission function for transmitting the image read from the scanner device 2 to the computer 9 via the LAN 8.

[Image Storage Function]

The image forming apparatus 1 includes an image storage function for storing the image read from the scanner device 2 on the hard disk 6 and transmitting and printing the recorded image.

[Image Printing Function]

The image forming apparatus 1 includes an image printing function for analyzing, for example a Page Description Language (PDL), a file transmitted from the computer 9, and printing the analyzed file using the printer device 4.

Figure 2:
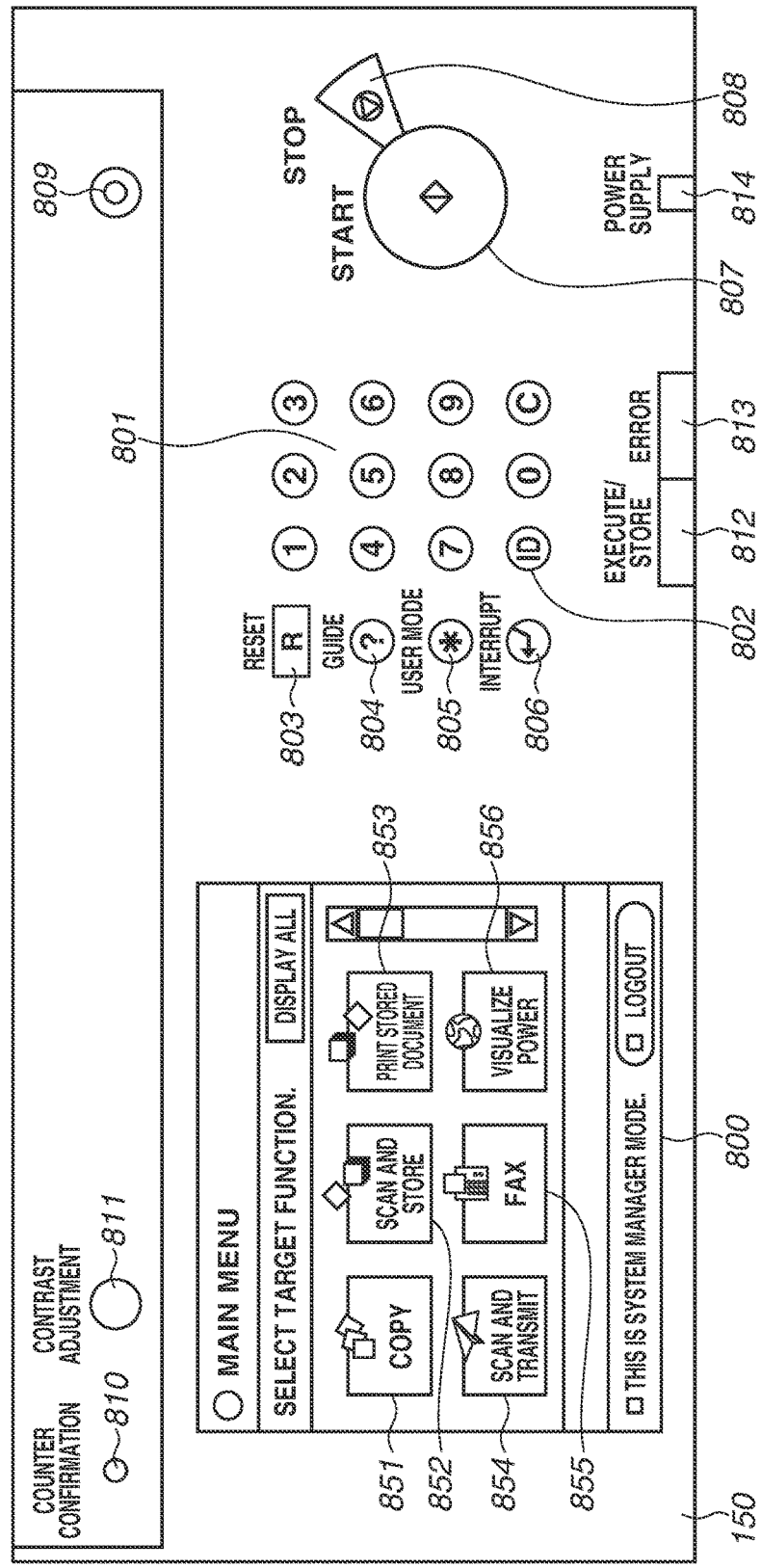
FIG. 2 is a plan view illustrating a configuration of an operation unit.

FIG. 2 is a plane view illustrating a configuration of the operation unit 5 illustrated in FIG. 1. The operation unit 5 (I/F) is connected to the controller 3 and includes a liquid crystal display (LCD) touch panel 800 that provides a user interface for operating the image forming apparatus 1.

In FIG. 2, the LCD touch panel 800 is used to perform main mode setting and provide a status display. A numeric keypad 801 is used to input numerical values from 0 to 9. An identifier (ID) key 802 is used, for example, when a department number and a password mode are input if the image forming apparatus 1 is, for example, under management of a department.

A reset key 803 is used to reset a set mode, a guide key 804 is used to display a description screen for each mode, a user mode key 805 is used to enter a user mode screen, and an interrupt key 806 is used to perform interrupt copying.

A start key 807 is used to start a copy operation, and a stop key 808 is used to stop a copy job that is currently being executed. When a power saving key 809 is pressed, a backlight of the LCD touch panel 800 is turned off, so that the image forming apparatus 1 enters into a sleep mode (second power status).

When a counter confirmation key 810 is pressed, a count screen to display the total number of copies made to date is displayed on the LCD touch panel 800. An adjustment key 811 is used to adjust a contrast of the LCD touch panel 800.

A light emitting diode (LED) 812 is used to indicate that an image is being stored in an image memory while a job is being executed, an error LED 813 is used to indicate an error condition with the image forming apparatus 1, e.g., paper jam, cover/door open, etc., and a power supply LED 814 is used to indicate that a main power switch (not shown) of the image forming apparatus 1 is on.

"Copy" 851, "Scan and Store" 852, "Print Stored Document" 853, "Scan and Transmit" 854, "FAX" 855, and "Visualize Power" 856 are keys used to change the screen of the LCD touch panel 800 to the screens associated with their respective functions.

"Copy" key 851 transitions the screen to a copy function screen.

"Scan and Store" key 852 transitions the screen to a function screen to enable storing an image scanned by the scanner device 2 in the HDD 6. "Print Stored Document" key 853 transitions the screen to a function screen enabling printing of the image stored in the HDD 6 using the printer device 4.

"Scan and Transmit" key 854 transitions the screen to a function screen to send the image scanned by the scanner device 2 to the computer 9 via the LAN 8. "FAX" key 855 transitions the screen to a function screen to print data received by the FAX device 7 using the printer device 4 via the controller 3. "Visualize Power" key 856 transitions the screen to a function screen to confirm the power status of the image forming apparatus 1.

The screen displayed on the LCD touch panel 800 when the "copy" key 851 is pressed will be described below with reference to FIG. 3.

Figure 3:
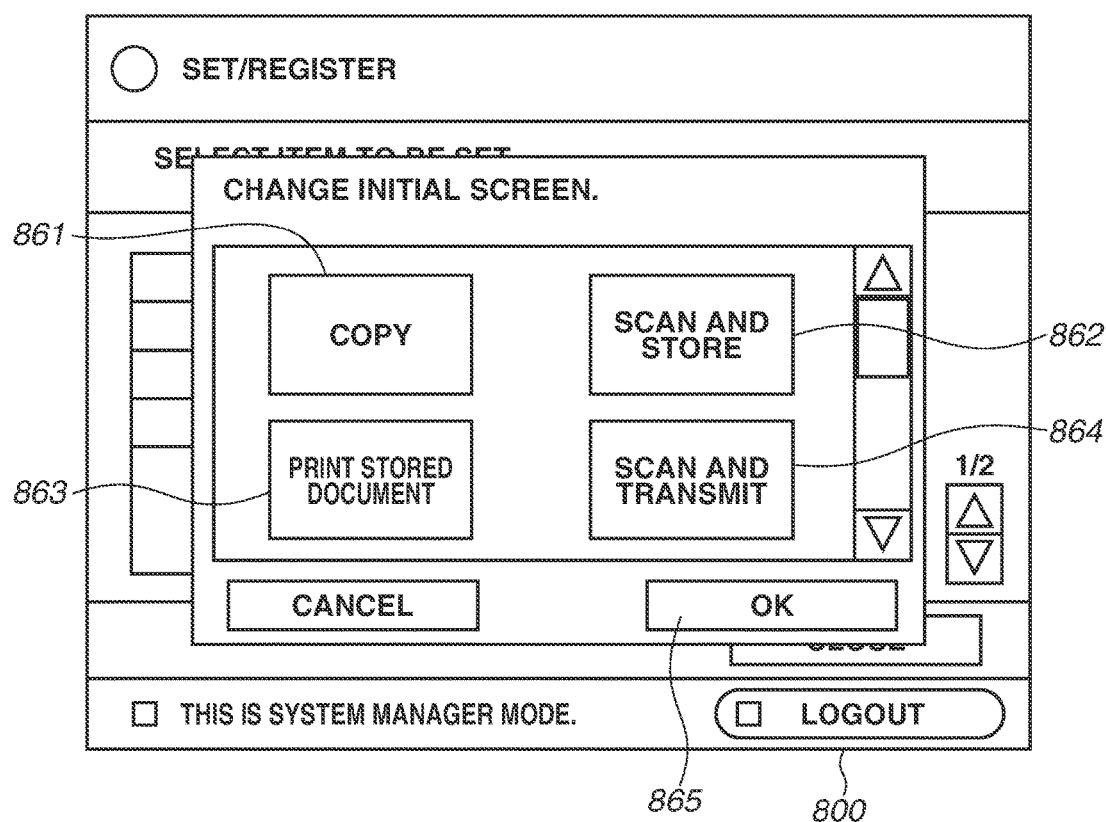
FIG. 3 illustrates a user interface (UI) screen displayed on a liquid crystal display (LCD) touch panel.

FIG. 3 illustrates an example of a user interface (UI) screen displayed on the LCD touch panel 800 illustrated in FIG. 2. This example is an example of a setting change screen. A screen displayed on the LCD touch penal 800 at the time of start and return from sleep is referred to as an initial screen.

In FIG. 3, when "copy" key 861 for changing the initial screen to a copy screen is pressed, a screen illustrated in FIG. 4A-A is displayed on the LCD touch panel 800. If "scan and store" key 862 for changing the initial screen to a "scan and store" screen is pressed, a screen illustrated in FIG. 4A-B is displayed on the LCD touch panel 800.

If "print stored document" key 863 for changing the initial screen to a "print stored document" screen is pressed, a screen illustrated in FIG. 4B-A is displayed on the LCD touch panel 800. When "scan and transmit" key 864 for changing the initial screen to a "scan and transmit" screen is pressed, a screen illustrated in FIG. 4B-B is displayed on the LCD touch panel 800.

LCD touch panel 800 can include other additional selectable keys other than the above-described keys. LCD touch panel 800 can display other additional setting screens in addition to the above-described screens.

Figure 5:
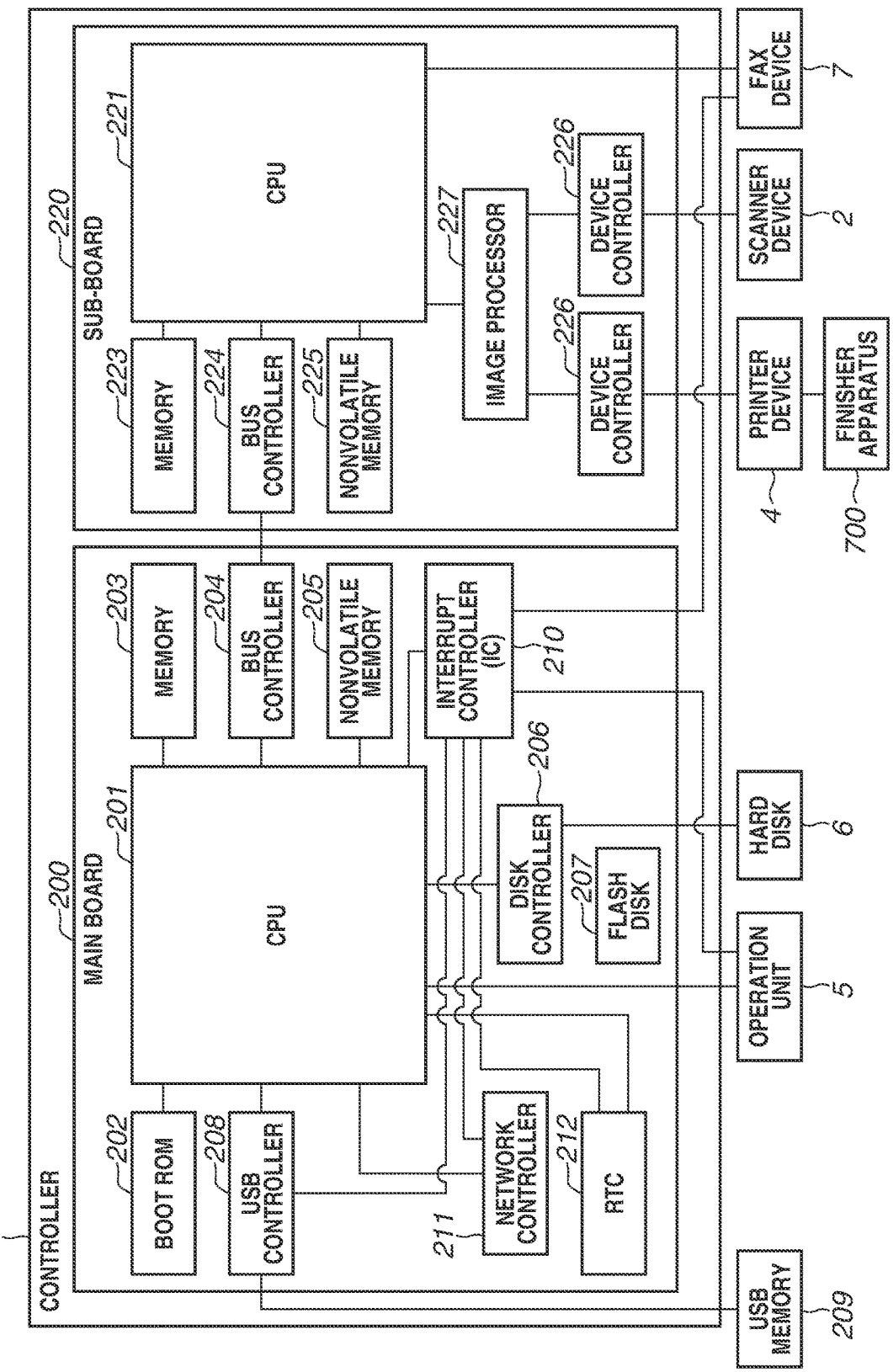
FIG. 5 is a block diagram illustrating a configuration of a controller.

FIG. 5 is a block diagram illustrating a configuration of the controller 3 illustrated in FIG. 1. A power supply status in this example is a standby state, i.e., a state where power is supplied to all the devices.

In FIG. 5, the controller 3 includes a main board 200 and a sub-board 220. The main board 200 is a general-purpose central processing unit (CPU) system. The main board 200 includes a CPU 201 that controls the entire board, a boot read-only memory (ROM) 202 storing a boot program, a memory 203 used as a work memory by the CPU 201, a bus controller 204 including a bridge function with an external bus, and a nonvolatile memory 205 that maintains the stored data even when the power thereto is turned off.

The main board 200 also includes a disk controller 206 that controls a storage device, a flash disk 207 such as a solid state drive (SSD) serving as a storage device including a semiconductor device and having a relatively small capacity, and a universal serial bus (USB) controller 208 that controls a USB interface.

A USB memory 209, the operation unit 5, and the hard disk 6 are externally connected to the main board 200. The CPU 201 is connected to an interrupt controller 210, and is further connected to a network controller 211, a Real Time Clock (RTC) 212, the FAX device 7, the operation unit 5 having a software switch, and the USB controller 208.

The sub-board 220 also includes a general-purpose CPU system, along with image processing hardware. The sub-board 220 includes a CPU 221 that controls the entire sub-board 220, a memory 223 used as a work memory by the CPU 221, a bus controller 224 including a bridge function with the external bus, and a nonvolatile memory 225 that maintains stored data even when the power thereto is turned off. The sub-board 220 also includes an image processor 227 that performs real-time digital image processing and a device controller 226.

The scanner device 2 and the printer device 4, which are externally connected to the sub-board 220, exchange digital image data therebetween via the device controller 226. The CPU 221 directly controls the FAX device 7. The finisher apparatus 700 processes the sheet discharged from the printer device 4.

An operation of the controller 3 will be described using image copying using a sheet as an example.

When the user issues an instruction from the operation unit 5 to copy an image, the CPU 201 sends an image reading instruction to the scanner device 2 via the CPU 221. The scanner device 2 optically scans a sheet document, converts the scanned sheet document into digital image data, and inputs the digital image data to the image processor 227 via the device controller 226. The image processor 227 performs Direct Memory Access (DMA) transfer to the memory 223 via the CPU 221, and temporarily stores the digital image data in the memory 223.

The CPU 201 issues an image output instruction to the printer device 4 via the CPU 221 when it is confirmed that a predetermined amount or all of the digital image data has entered the memory 223.

The CPU 221 notifies the image processor 227 of a position of the image data on the memory 223. The image data on the memory 223 is transmitted to the printer device 4 via the image processor 227 and the device controller 226 according to a synchronization signal from the printer device 4. The printer device 4 prints the digital image data on the sheet device.

When a plurality of copies of sheets is printed, the CPU 201 stores the image data on the memory 223 in the hard disk 6, and sends the image data to the printer device 4 without receiving the image data from the scanner device 2 for the second and subsequent print copies.

Figure 6:
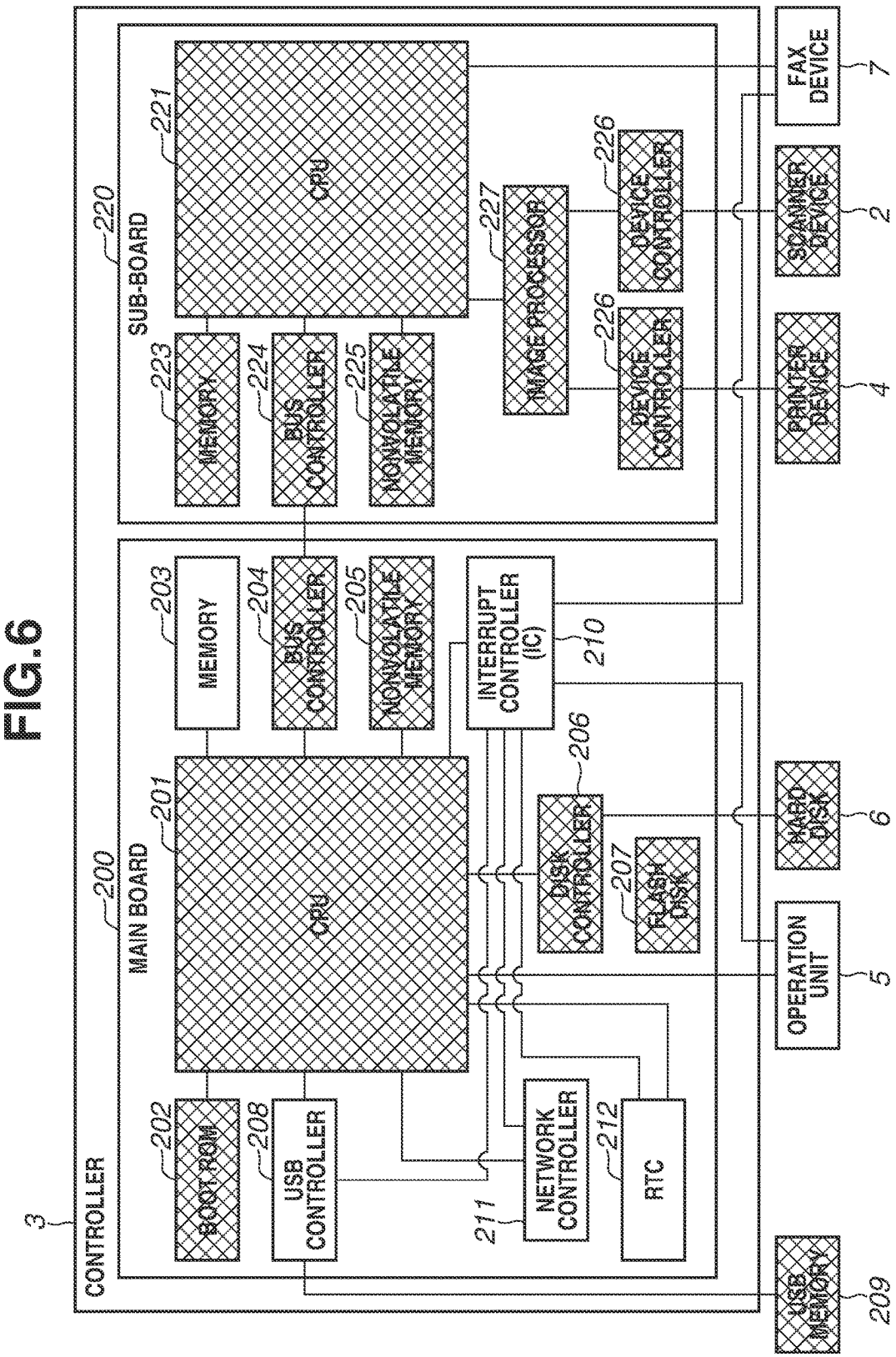
FIG. 6 is a block diagram illustrating a configuration of the controller.

FIG. 6 is a block diagram illustrating a configuration of the controller 3 illustrated in FIG. 1. A power supply status in this example corresponds to a state where the controller 3 is in a sleep mode.

In the present exemplary embodiment, a sleep mode is a state where a start time can be made earlier than a normal start time while suppressing power consumption. The image forming apparatus 1 shifts to the sleep mode when a predetermined period of time has elapsed where the user has not operated the image forming apparatus 1 and when the user presses the software switch on the operation unit 5.

In the sleep mode, power is supplied to a minimum number of required components, such as the memory 203 and the interrupt controller 210 on the controller 3, from a power supply unit 301 as described below.

In the sleep mode, power is supplied to the network controller 211, the RTC 212, the USB controller 208, which send a return-from-sleep interrupt to the interrupt controller 210, the software switch on the operation unit 5, various sensors, and a part of the FAX device 7.

More specifically, power is supplied from the power supply unit 301 during the sleep mode to the components other than the hatched portions illustrated in FIG. 6. The interrupt controller 210 receives, during the sleep mode, one or more interrupts, such as a network incoming call, an RTC for detecting a timer and an alarm, a FAX for detecting an incoming call and an off-hook, a software switch, sensors, a USB for detecting insertion/removal and communication, etc.

The interrupt controller 210 notifies, when it receives the interrupt, the CPU 201 of the received interrupt. The CPU 201 performs processing for supplying power and returning a state of software to a normal state upon receiving the notification. However, a return-from-sleep factor differs for each system. Thus, power supplying in the sleep mode is not restricted by this configuration.

Figure 7:
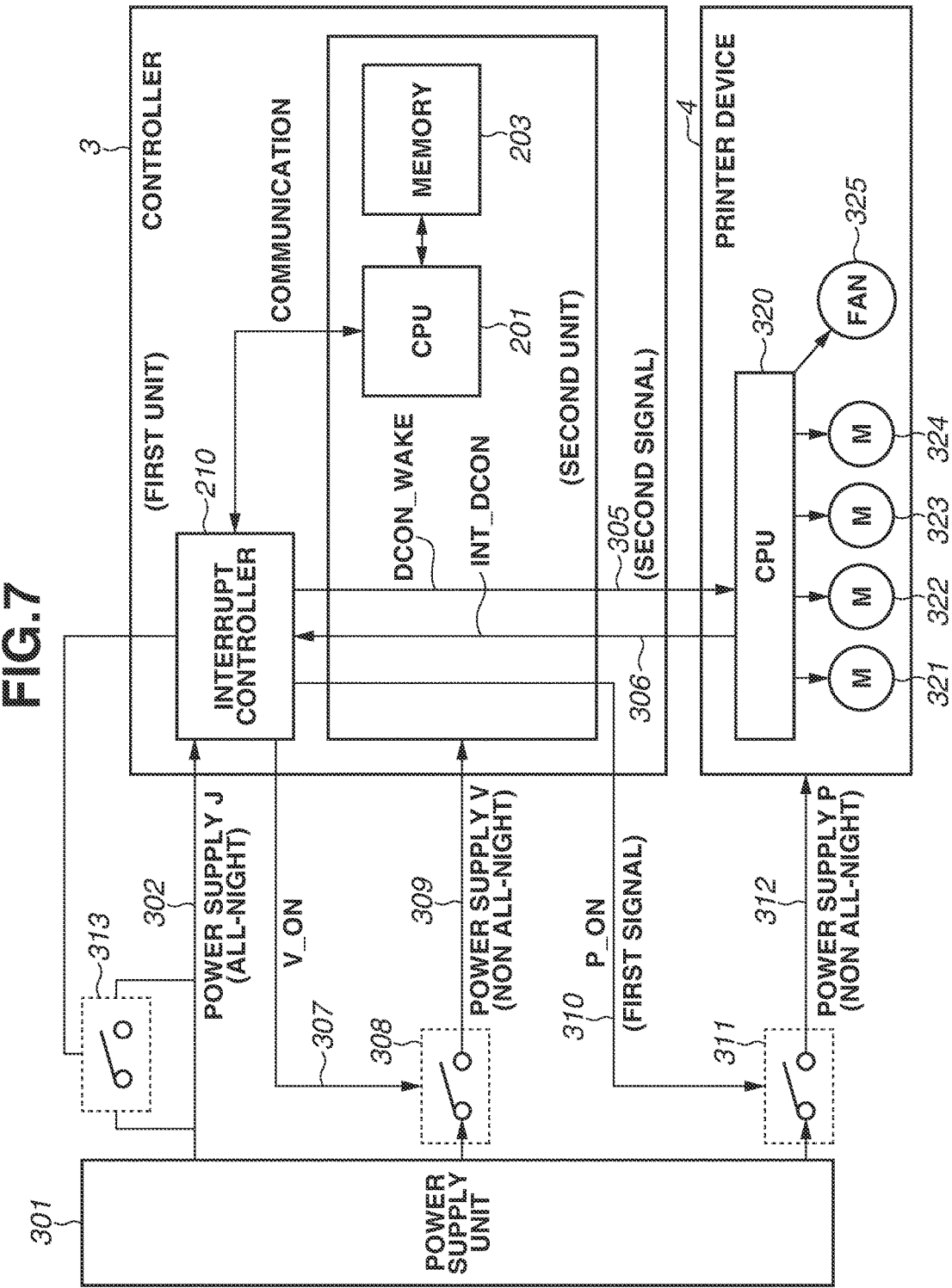
FIG. 7 is a block diagram illustrating a power supply configuration of an image forming apparatus.

FIG. 7 is a block diagram illustrating a power supply configuration of the image forming apparatus 1 illustrated in FIG. 1. For a configuration of the controller 3, the printer device 4, the interrupt controller 210, and the power supply unit 301 in the image forming apparatus 1, a portion related to the present exemplary embodiment will be described below with reference to FIG. 7. In FIG. 7, power is always supplied to the interrupt controller 210 via a path 302.

The interrupt controller 210 controls supplying of power to each of the units in the image forming apparatus 1. More specifically, the interrupt controller 210 performs control (High level/Low level) of an input/output (IO) signal V_ON 307, to switch ON/OFF of a relay switch 308. When the relay switch 308 is turned on, power is supplied to the controller 3 from the power supply unit 301 via a path 309. The interrupt controller 210 performs a previously set operation at the time of the start of a timer because a plurality of timer values is set in the interrupt controller 210 from the CPU 201 by communication.

The interrupt controller 210 performs control (High level/Low level) of an IO signal P_ON 310, to switch ON/OFF of a relay switch 311. When the relay switch 311 is turned on, power is supplied to the printer device 4 from the power supply unit 301 via a path 312. The interrupt controller 210 operates a predetermined IO signal in response to an instruction from the CPU 201. An IO signal 305 is a DCON_LIVEWAKE signal connected to the CPU 320 in the printer unit 4. When the printer device 4 is powered on while the DCON_LIVEWAKE signal is asserted, the printer device 4 does not perform a specific operation for controlling a movable unit. Therefore, the movable unit does not make a driving noise.

The above-described specific operation includes control of a rotation operation of the movable unit (for example, a motor, a roller, and a polygon mirror, drums 321 to 324, and FAN 325). The scanner device 2 can be controlled from the interrupt controller 210 in a manner similar to controlling the printer device 4, as such, description of controlling the scanner device 2 is omitted herein FIG. 8 is a block diagram illustrating a hardware configuration for monitoring the power of the controller 3 illustrated in FIG. 1.

Figure 8:
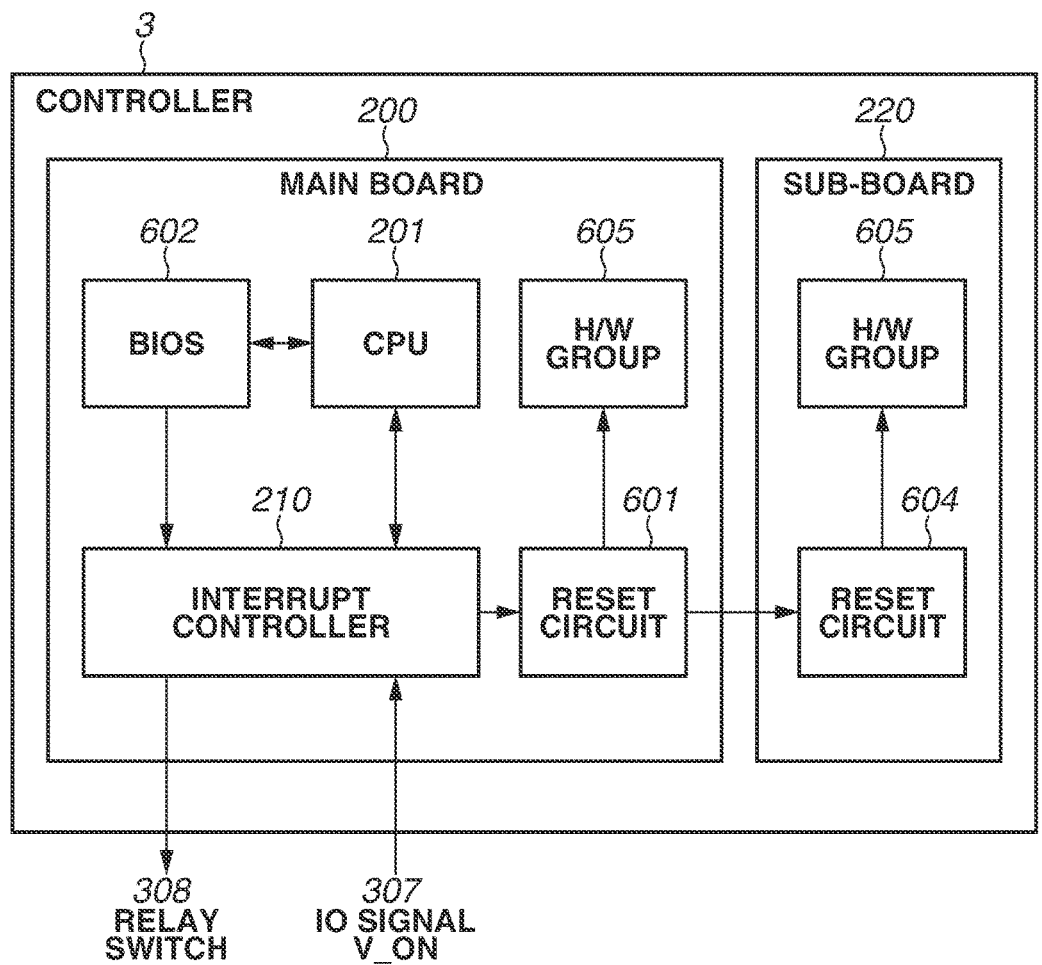
FIG. 8 is a block diagram illustrating a hardware configuration for monitoring a power supply.

In FIG. 8, a reset circuit 601 is provided on the main board 200. A Basic Input/Output System (BIOS) 602 controls a basic portion of hardware (H/W) on the main board 200. The BIOS 602 is configured as a dedicated H/W logic for monitoring power supply control of this system by the interrupt controller 210. The dedicated H/W logic may be a small CPU system when an Application Specific Integrated Circuit (ASIC) is used. A reset circuit 604 is provided on the sub-board 220. An H/W group 605 is provided on each of the main board 200 and the sub-board 220.

An internal state of a synchronous type H/W is reset by resetting. Thus, a reset circuit needs to reset each of synchronous type H/Ws after an H/W circuit configured by the synchronous type H/Ws is powered on and power is then supplied to each chip.

One reset circuit is generally included in each board and performs a reset operation in the board.

A system for the main board 200 is a main board in the image forming apparatus 1, and includes the interrupt controller 210. The interrupt controller 210 performs control (High level/Low level) of the IO signal V_ON 307 to turn on the relay switch 308 and to control power supply in the main board 200 and the sub-board 220.

During normal operation of the CPU 201, the system can be reset in response to an instruction from the CPU 201. While power is not supplied to the CPU 201, when the interrupt controller 210 controls the IO signal V_ON 307, the relay switch 308 is turned on, and power is supplied to the controller 3.

In the image forming apparatus 1 having the above-mentioned H/W configuration, when a seesaw switch 313 is turned off, for example, the CPU 201 can receive a state of the seesaw switch 313 via the interrupt controller 210. More specifically, the CPU 201 detects power-off, to operate a shutdown sequence. The interrupt controller 210 turns off the relay switch 308 and the relay switch 311 when the CPU 201 completes shutdown processing. As a result, the system completely shuts down.

[Power Supplying Processing in Start State]

Processing associated with starting the image forming apparatus 1 will now be described. To power on the image forming apparatus 1, an operator turns on the seesaw switch 313. Consequently, the interrupt controller 210 detects power-on from the IO signal V_ON 307. The relay switch 308 operates based on the IO signal V_ON 307, so that power is supplied to the entire image forming apparatus 1 from the power supply unit 301.

The interrupt controller 210 supplies power to the entire system according to the time of the power-on, and specifically energizes the controller 3, the printer device 4, and the scanner device 2 via each DC power supply path. A CPU in each of the printer device 4 and the scanner device 2 starts an initialization operation as a result of the power-on.

[Power Supplying Status in Sleep Mode]

A sleep mode of the image forming apparatus 1 will now be described.

The sleep mode is a state where a start time is made earlier than a normal start time while suppressing power consumption. The image forming apparatus 1 shifts to the sleep mode when a predetermined period of time has elapsed while the user does not operate the image forming apparatus 1, and when the user presses the power saving key 809 on the operation unit 5.

Now, power supply of hardware will be described.

Power supplied from the power supply unit 301 is supplied to the controller 3 via the path 309. During the sleep mode, power is supplied to a minimum required number of components, described below, such as the controller 3 and the operation unit 5. In the controller 3, the minimum required components include the memory 203, the interrupt controller 210, the network controller 211, the RTC 212, and the USB controller 208. In the operation unit 5, the minimum required components include the power saving key 809, a part of the FAX device 7, and the various sensors. The return-from-sleep factor differs for each system. Thus, supplying power supply during the sleep mode is not restricted by this configuration.

Now, software operation will be described.

The interrupt controller 210 receives, during the sleep mode, one or more interrupts of an network, an RTC for detecting a timer and an alarm, a FAX for detecting an incoming call and an off-hook, the power saving key 809, the various sensors, and a USB for detecting insertion/removal and communication. The interrupt controller 210 performs processing for notifying the CPU 201 of the above-mentioned return factor and returning a state of supplying power and software to a normal state upon receiving the notification.

[Power Supplying Status During Non-Use State of Printer Device 4 and Scanner Device 2 in Normal State]

Next, supplying power in a normal state, where the printer device 4 and the scanner device 2 are not used, of the image forming apparatus 1 will be described.

The normal state is not only a state where power is supplied to all the units, but also a state where power is not supplied to the printer device 4 from the power supply unit 301 when printing is not performed and a state where power is not supplied to the scanner device 2 from the power supply unit 301 when the operation unit 5 is not lit up and therefore, it can be found that the user is not positioned in front of the image forming apparatus 1.

Power is supplied from the power supply unit 301 to speed up completion of printing by the printer device 4 and completion of reading by the scanner device 2. However, there is an operation wait state serving as a state where a motor or a polygon mirror for printing is not operated, a state where a transfer unit for printing is not temperature-adjusted, and a state where detection of a home position for reading is not operated.

[Power Supplying Status of Printer Device 4 and Scanner Device 2 in PDL Printing]

Next, supplying power while the printer device 4 and the scanner device 2 are used in a PDL print status of the image forming apparatus 1 will be described.

Power-on and power-off of the printer device 4 will be described using an image printing function.

The CPU 201 in the controller 3 receives data in the memory 203 from the computer 9 via the LAN 8. The CPU 201 analyzes the received data, and generates a print job when executing the image printing function.

The CPU 201 notifies the interrupt controller 210 of a remote signal via the seesaw switch 313, to supply power to the printer device 4 from the power supply unit 301. The CPU 201 executes the print job when the printer device 4 is ready to be used. The CPU 201 transmits data to the printer device 4 from the memory 203 via the bus controller 204, the bus controller 224, the CPU 201, the image processor 227, and the device controller 226. The printer device 4 prints the received data, and notifies the CPU 201 of a printing result when the printing is completed. The CPU 201 notifies the power supply control unit of a remote signal via the relay switch 308 when the printing is completed, and powers off the printer device 4.

[Processing for Starting Controller 3]

Next, processing for starting the controller 3 will be described.

The interrupt controller 210 controls the IO signal V_ON 307 when it detects that the seesaw switch 313 has been turned on, to turn on the relay switch 308. Thus, power is supplied to the controller 3 from the power supply unit 301.

The CPU 201, to which power has been supplied, initializes hardware. The initialization of the hardware includes register initialization, interrupt initialization, registration of a device driver at the time of kernel start, and initialization of the operation unit 5.

The CPU 201 then initializes software. The software initialization includes calling of an initialization routine for each library, start of a process and a thread, start of a software service for performing communication with the printer device 4 and the scanner device 2, and drawing by the operation unit 5. Finally, the CPU 201 shifts to an idle state.

[Shift-to-Sleep Processing by Controller 3]

Next, shift-to-sleep processing by the controller 3 will be described.

When an idle state, i.e., state not used by the user, is continued for a predetermined period of time, the CPU 201 causes the image forming apparatus 1 to shift to a sleep mode. More specifically, the CPU 201 instructs the interrupt controller 210 to enter a power supply status as illustrated in the block diagram of the controller 3 during sleep, as described above in FIG. 6.

[Return-from-Sleep Processing by Controller 3]

Next, return-from-sleep processing by the controller 3 will be described.

The CPU 201 returns from sleep when it receives an event, such as pressing of the power saving key 809, serving as a return-from-sleep factor during sleep. The interrupt controller 210 controls the IO signal V_ON 307 and the IO signal P_ON 310 when it detects the above-mentioned event, to perform control so that power is supplied to the controller 3, the printer device 4, and the scanner device 2 form the power supply unit 301.

When a predetermined period of time has elapsed since the print job ended, the CPU 201 causes the image forming apparatus to shift to a sleep mode. The CPU 201 notifies the interrupt controller 210 of a remote signal, and stops supplying power to the units other than the controller 3 from the power supply unit 301.

[When User Selects Copy Screen and Image Forming Apparatus Returns from DeepSleep]

Hereinbelow, processing performed when the user selects a copy screen and the image forming apparatus 1 returns from DeepSleep will be described with reference to FIGS. 9 to 11.

Figure 9:
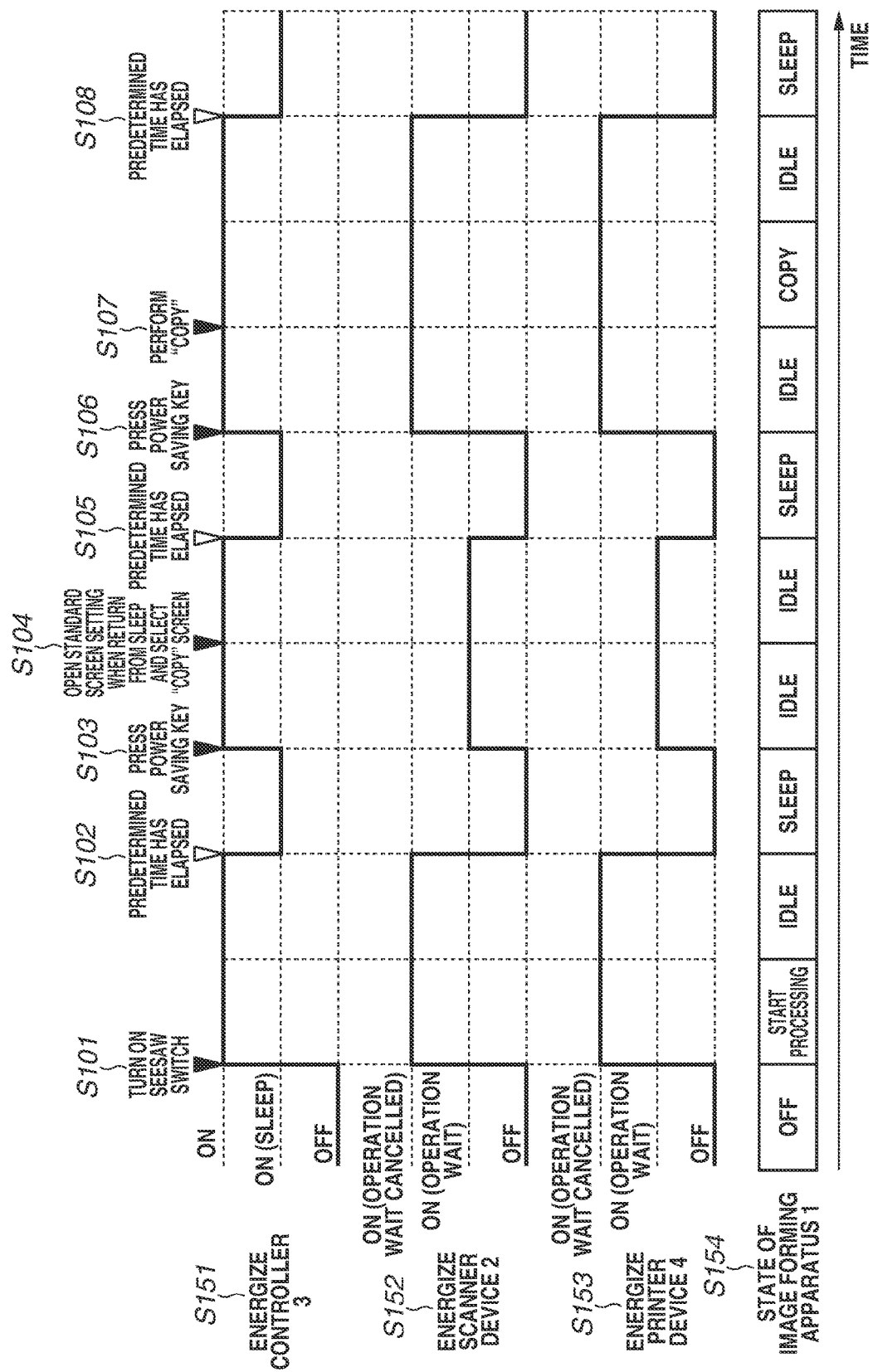
FIG. 9 is a timing chart illustrating a power supplying status of the image forming apparatus.

FIG. 9 is a timing chart illustrating a power supplying status of the image forming apparatus 1 according to the present exemplary embodiment. This example corresponds to respective energized states of the printer device 4 and the scanner device 2 illustrated in FIG. 1.

In FIG. 9, an X-axis represents time, and a Y-axis represents energization of the printer device 4 and the scanner device 2 and execution of a job.

A job execution status (S154) changes due to occurrence of an event. The solid lines (S151, S152, and S153) respectively indicate how the energized state of the controller 3, the scanner device 2, and the printer device 4 changes.

The uppermost solid line indicates an energized state of the controller 3 having three states, i.e., ON, ON of a sleep mode, and OFF (S151). The subsequent solid line indicates an energized state of the scanner device 2 having three states, i.e., ON of an operation wait cancelled state, ON of an operation wait state, and OFF (S152).

The subsequent solid line indicates an energized state of the printer device 4 having three states, i.e., ON of an operation wait cancelled state, ON of an operation wait state, and OFF (S153). The lowermost solid line indicates the job execution status of the image forming apparatus 1 (S154).

When the user turns on the seesaw switch 313 provided in a main body of the image forming apparatus 1, the image forming apparatus 1 performs the above-mentioned start processing (S101). When a predetermined period of time has elapsed while the image forming apparatus 1 is in an idle state after being started, the image forming apparatus 1 performs the above-mentioned shift-to-sleep processing (S102). When the user presses the power saving key 809, the image forming apparatus 1 enters an idle state (S103).

Figure 10:
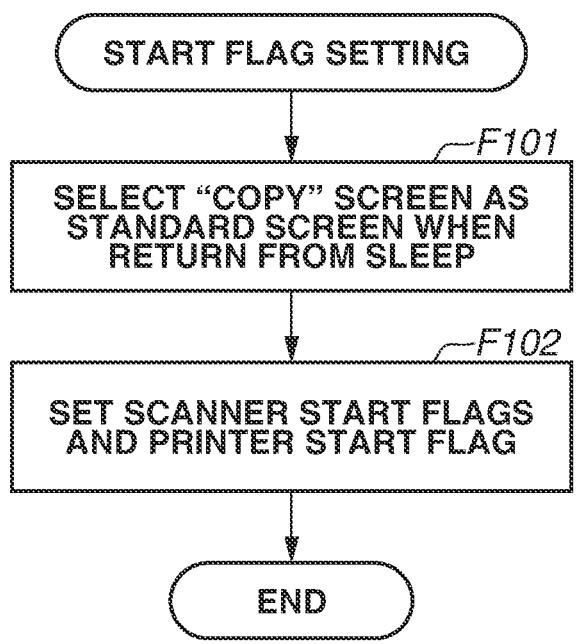
FIG. 10 is a flowchart illustrating a method for controlling the image forming apparatus.

FIG. 10 is a flowchart illustrating a method for controlling the image forming apparatus 1 according to the present exemplary embodiment. This example is an example of flag setting processing by the controller 3 in the image forming apparatus 1.

The user opens a standard screen setting during return from sleep, described above, and selects the "copy" key 861 (S104). Then, in step F101, the CPU 201 sets a standard screen to a "copy" screen. In step F102, the CPU 201 sets a scanner start flag and a printer start flag, which is used by a "copy" function, in a register of the interrupt controller 210. This processing may be performed only once.

Figure 11:
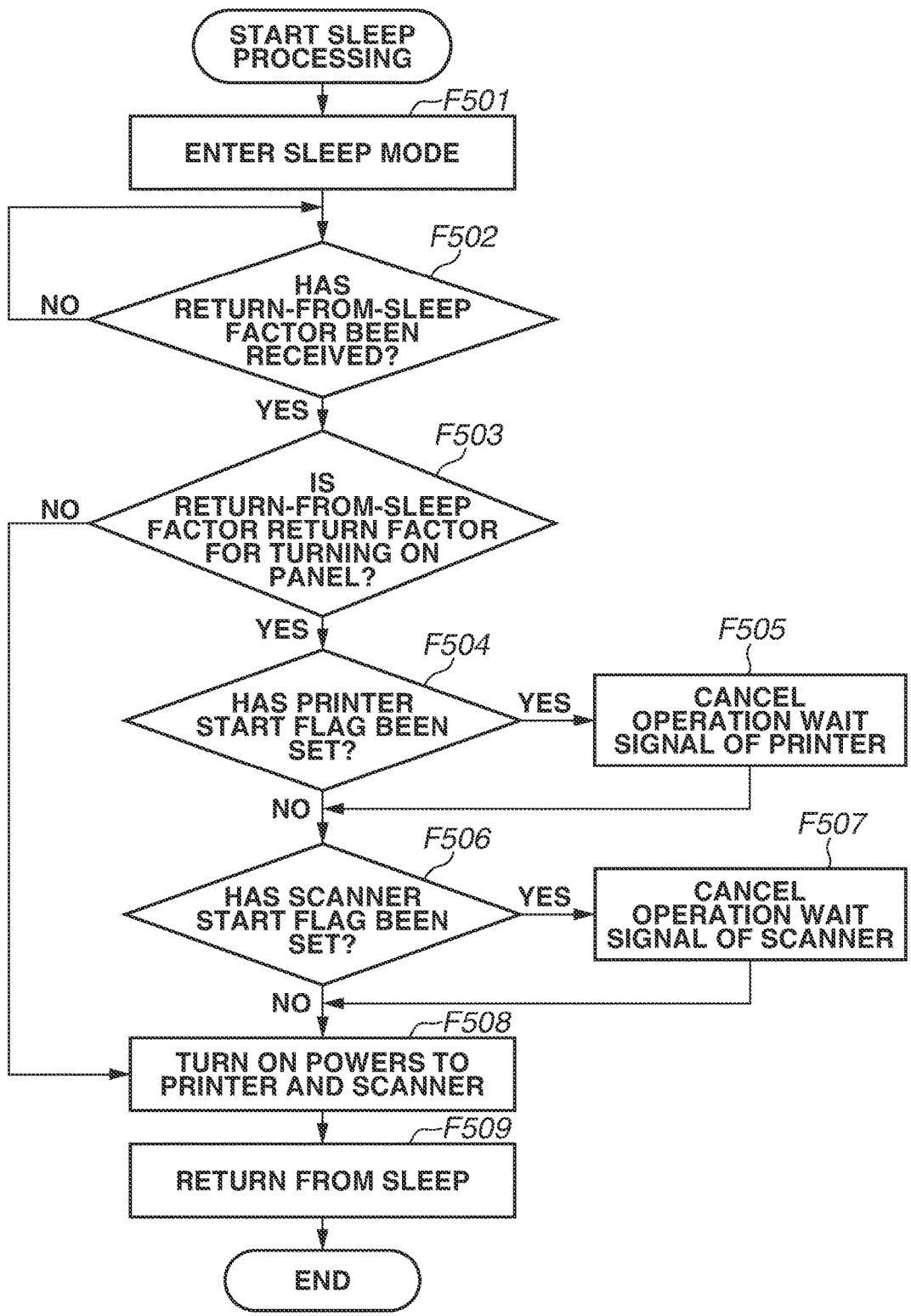
FIG. 11 is a flowchart illustrating a method for controlling an image forming apparatus.

FIG. 11 is a flowchart illustrating a method for controlling the image forming apparatus 1 according to the present exemplary embodiment. This example is return-from-sleep processing by the controller 3 in the image forming apparatus 1.

In step F501, the CPU 201 turns off a backlight of the LCD touch panel 800 and causes the image forming apparatus 1 to enter a sleep mode when it detects that the user has not operated the image forming apparatus 1 for a predetermined period of time by pressing the power saving key 809 or using a timer (step S105). In step F502, the CPU 201 determines whether the image forming apparatus 1 has received a factor serving as a return-from-sleep request, such as pressing of the power saving key 809 by the user (S106) or detection by a sensor. If the image forming apparatus 1 has received the return-from-sleep factor (YES in step F502), the CPU 201 starts return-from-sleep processing. Then, the processing proceeds to step F503.

In step F503, the CPU 201 determines whether the return-from-sleep factor is a return factor for turning on a UI panel in the operation unit 5, for example, pressing of the power saving key 809, detection by a sensor, or reception of data.

If the CPU 201 determines that the return-from-sleep factor is the return factor for turning on the UI panel due to a request to cancel a power saving state by a key operation (YES in step F503), then in step F504, the CPU 201 determines whether a printer start flag has been set in the register of the interrupt controller 210. If the CPU 201 determines that the return-from-sleep factor is not the return factor for turning on the UI panel (NO in step F503), the processing proceeds to step F508. If the CPU 201 determines that the printer start flag has been set (YES in step F504), then in step F505, the CPU 201 cancels an operation wait signal of the printer device 4. In the present exemplary embodiment, the printer start flag has been set (YES in step F504), and thus the CPU 201 cancels an operation wait signal of the printer device 4. If the CPU 201 determines that the printer start flag has not been set (NO in step F504), the processing proceeds to step F506.

In step F506, the CPU 201 simultaneously determines whether a scanner start flag has been set in the register of the interrupt controller 210. If the CPU 201 determines that the scanner start flag has been set (YES in step F506), then in step F507, the CPU 201 cancels an operation wait signal of the scanner device 2. In the present exemplary embodiment, the scanner start flag has been set (YES in step F506), and thus the CPU 201 cancels the operation wait signal of the scanner device 2.

If the CPU 201 determines that the scanner start flag has not been set (NO in step F506), then in step F508, the CPU 201 powers on the printer device 4 and the scanner device 2. In step F509, the CPU 201 causes the image forming apparatus 1 to return from sleep. In the present exemplary embodiment, the CPU 201 powers on the printer device 4 and the scanner device 2 in an operation wait cancelled state, to perform operations such as detection of a home position for motor driving, detection of sheets in a cassette stage for motor driving, and rotation of a polygon mirror.

According to the present exemplary embodiment, when "copy" is performed at the time of return from sleep (S107), a period of time elapsed until printing is completed can be shortened because the image forming apparatus 1 powers on the scanner device 2 and the printer device 4 in the operation wait cancelled state at the time of return from sleep.

On the other hand, when an operation other than the "copy" is performed at the time of return from sleep, a period of time elapsed until printing is completed can be made as short as possible because the image forming apparatus 1 powers on the scanner device 2 and the printer device 4 in the operation wait state during return from sleep.

In the present exemplary embodiment, the return-from-sleep processing from power-off states of the scanner device 2 and the printer device 4 has been described.

However, the image forming apparatus 1 may return from sleep from power-on states of the scanner device 2 and the printer device 4. In such a case, the scanner device 2 and the printer device 4 do not change in state when powered on in step F508. However, initialization processing is performed when the operation wait signal is canceled in each of steps F505 and F507. Thus, a similar effect to that in the first exemplary embodiment can be obtained, although details thereof are omitted.

A second exemplary embodiment is characterized in that, when a "scan and store" screen is set as a standard screen, an operation wait is canceled only for a scan function.

The second exemplary embodiment will be described below with reference to FIGS. 11, 12, and 13.

Figure 12:
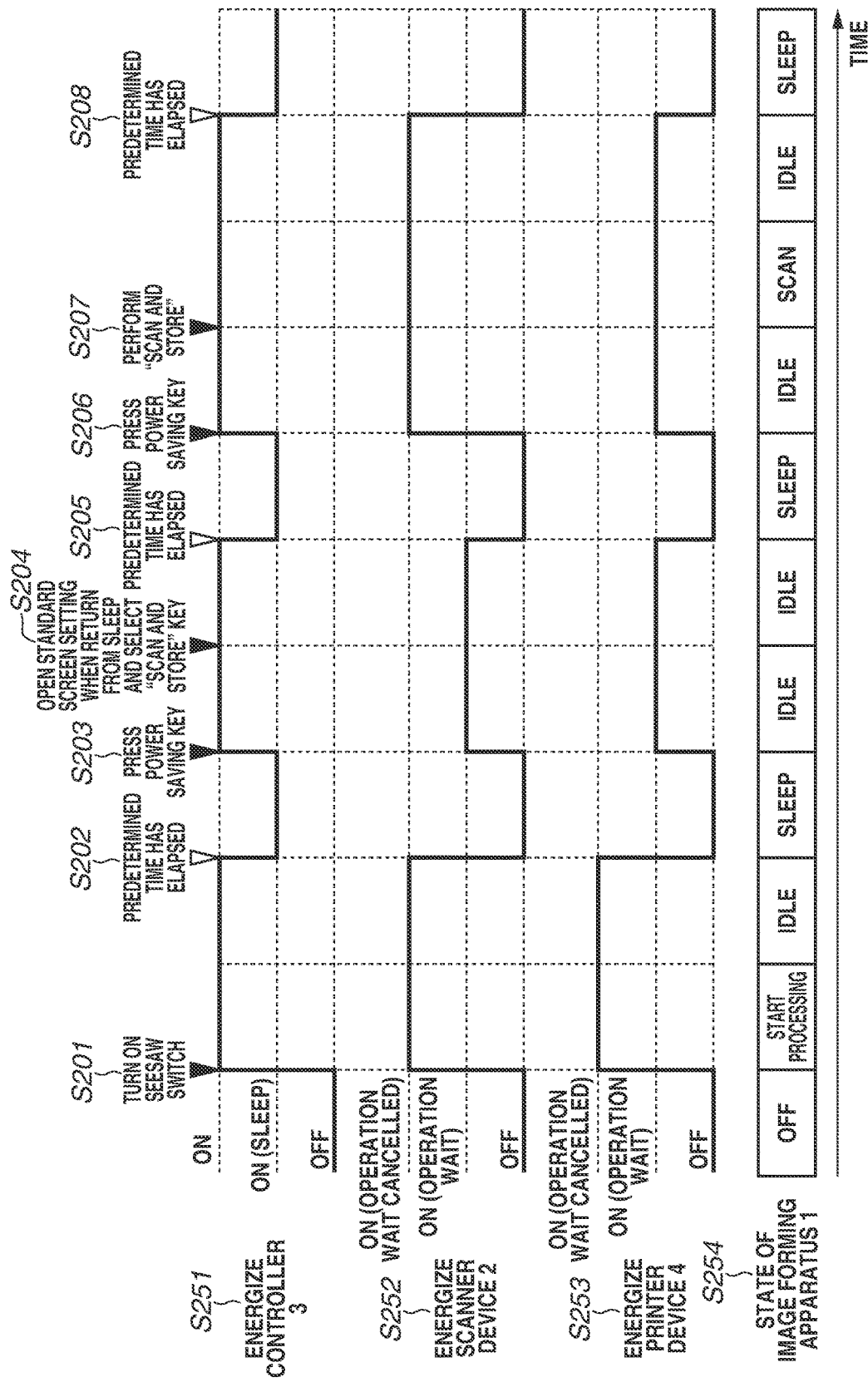
FIG. 12 is a timing chart illustrating a power supplying status of the image forming apparatus.

FIG. 12 is a timing chart illustrating a power supplying status of an image forming apparatus 1 according to the present exemplary embodiment. This example corresponds to energized states of a printer device 4 and a scanner device 2 illustrated in FIG. 1.

In FIG. 12, an X-axis represents time, and a Y-axis represents energization of the printer device 4 and the scanner device 2 and execution of a job. FIG. 12 is substantially the same as FIG. 9 described in the first exemplary embodiment, and hence description thereof is not repeated.

Figure 13:
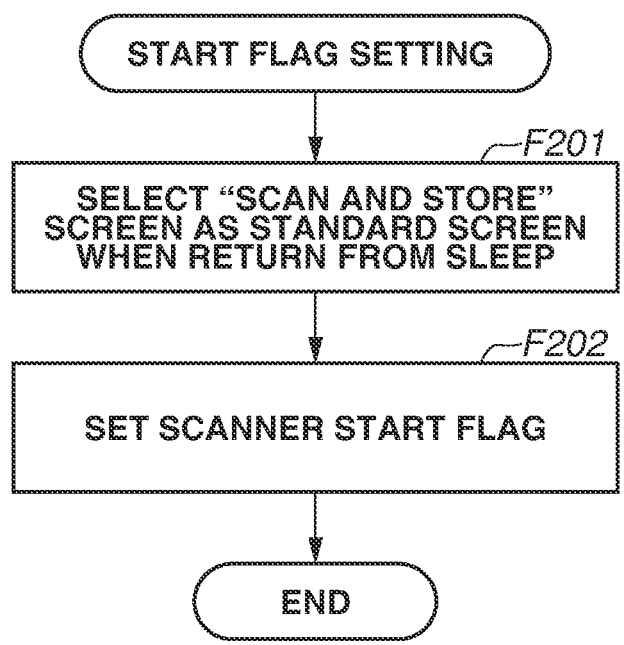
FIG. 13 is a flowchart illustrating a method for controlling the image forming apparatus.

FIG. 13 is a flowchart illustrating a method for controlling the image forming apparatus 1 according to the present exemplary embodiment. This example is flag setting processing by a controller 3 in the image forming apparatus 1.

A user opens a standard screen setting during return from sleep, described above, and selects a "scan and store" key 862 (S204). Then, in step F201, a CPU 201 sets a standard screen during return from sleep to a "scan and store" screen. In step F202, the CPU 201 sets a scanner start flag, which is used by a "scan and store" functions, in a register of an interrupt controller 210. This processing may be performed only once.

Return-from-sleep processing in the present exemplary embodiment will be described below with reference to FIG. 11.

In step F501, the CPU 201 turns off a backlight of an LCD touch panel 800, and causes the image forming apparatus 1 to enter a sleep mode when it detects that the user has not operated the image forming apparatus 1 for a predetermined period of time by pressing a power saving key 809 or using a timer (S205).

In step F502, the CPU 201 then determines whether the image forming apparatus 1 has received a return-from-sleep factor, such as pressing of the power saving key 809 by the user (S206) or detection by a sensor. If the image forming apparatus 1 has received the return-from-sleep factor (YES in step F502), the CPU 201 starts return-from-sleep processing. Then, the processing proceeds to step F503. In step F503, the CPU 201 determines whether the return-from-sleep factor is a return factor for turning on a UI panel in an operation unit 5, for example, pressing of the power saving key 809 or detection by a sensor.

If the CPU 201 determines that the return-from-sleep factor is the return factor for turning on the UI panel (YES in step F503), then in step F504, the CPU 201 determines whether a printer start flag has been set in the register of the interrupt controller 210. If the CPU 201 determines that the return-from-sleep factor is not the return factor for turning on the UI panel (NO in step F503), the processing proceeds to step F508. If the CPU 201 determines that the printer start flag has been set (YES in step F504), then in step F505, the CPU 201 cancels an operation wait signal of the printer device 4. In the present exemplary embodiment, the printer start flag has not been set (NO in step F504), and thus the CPU 201 does not cancel the operation wait signal of the printer device 4.

If the CPU 201 determines that the printer start flag has not been set (NO in step F504), then in step F506, the CPU 201 simultaneously determines whether a scanner start flag has been set in the register of the interrupt controller 210.

If the CPU 201 determines that the scanner start flag has been set (YES in step F506), then in step F507, the CPU 201 cancels an operation wait signal of the scanner device 2. In the present exemplary embodiment, the scanner start flag has been set (YES in step F506), and thus the CPU 201 cancels the operation wait signal of the scanner device 2.

If the CPU 201 determines that the scanner start flag has not been set (NO in step F506), then in step F508, the CPU 201 powers on the printer device 4 and the scanner device 2. In step F509, the CPU 201 causes the image forming apparatus 1 to return from sleep. In the present exemplary embodiment, the CPU 201 powers on only the scanner device 2 in an operation wait cancelled state, to perform an operation such as detection of a home position for motor driving.

According to the present exemplary embodiment, when "scan and store" is performed during return from sleep (S207), a period of time elapsed until the scanner device 2 completes scanning can be shortened because the image forming apparatus 1 powers on the scanner device 2 in the operation wait cancelled state during return from sleep.

On the other hand, when an operation other than the "scan and store" is performed at the time of return from sleep, a period of time elapsed until printing is completed can be made as short as possible because the image forming apparatus 1 powers on the scanner device 2 in an operation wait state during return from sleep.

The flow in the present exemplary embodiment can also be used even when a function such as a "scan and transmit" key 864 using only a scanner and not using a printer is selected instead a "scan and store" key 862 being selected on an initial screen illustrated in FIG. 3. However, a content of a control procedure when the "scan and transmit" key 864 is selected overlaps that when the "scan and store" key 862 is selected, and hence description thereof is not repeated.

In a third exemplary embodiment, when a "print stored document" screen is set as a standard screen, an operation wait is canceled for only a printer.

The third exemplary embodiment will be described below with reference to FIGS. 11, 14, and 15.

FIG. 14 is a timing chart illustrating a power supplying status of an image forming apparatus 1 according to the present exemplary embodiment. This example corresponds to energized states of a printer device 4 and a scanner device 2 illustrated in FIG. 1.

In FIG. 14, an X-axis represents time, and a Y-axis represents energization of the printer device 4 and the scanner device 2 and execution of a job. FIG. 14 is substantially the same as FIG. 9 described in the first exemplary embodiment, and hence description thereof is not repeated.

FIG. 15 is a flowchart illustrating a method for controlling the image forming apparatus 1 according to the present exemplary embodiment. This example is flag setting processing by a controller 3 in the image forming apparatus 1.

A user opens a standard screen setting during return from sleep, described above, and selects a "print stored document" key 863 (S304). Then, in step F301, a CPU 201 sets a standard screen during return from sleep to a "print stored document" screen. In step F302, the CPU 201 sets a printer start flag, which a "print stored document" function uses, in a register of an interrupt controller 210. This processing may be performed only once. Return-from-sleep processing in the present exemplary embodiment will be described below with respect to the flowchart illustrated in FIG. 11.

In step F501, the CPU 201 turns off a backlight of an LCD touch panel 800, and causes the image forming apparatus 1 to enter a sleep mode when it detects that the user has not operated the image forming apparatus 1 for a predetermined period of time by pressing a power saving key 809 or using a timer (S305). In step F502, the CPU 201 then determines whether the image forming apparatus 1 has received a return-from-sleep factor, such as pressing of the power saving key 809 by the user (S306) or detection by a sensor. If the image forming apparatus 1 has received a return-from-sleep factor (YES in step F502), the CPU 201 starts return-from-sleep processing. Then, the processing proceeds to step F503.

In step F503, the CPU 201 determines whether the return-from-sleep factor is a return factor for turning on a UI panel in an operation unit 5, for example, pressing of the power saving key 809 or detection by a sensor.

If the CPU 201 determines that the return-from-sleep factor is the return factor for turning on the UI panel (YES in step F503), then in step F504, the CPU 201 confirms whether a printer start flag has been set in the register of the interrupt controller 201. If the CPU 201 determines that the return-from-sleep factor is not the return factor for turning on the UI panel (NO in step F503), the processing proceeds to step F508.

On the other hand, if the CPU 201 determines that the printer start flag has been set (YES in step F504), then in step F505, the CPU 201 cancels an operation wait signal of the printer device 4. In the present exemplary embodiment, the printer start flag has been set (YES in step F504), and thus the CPU 201 cancels the operation wait signal of the printer device 4. If the CPU 201 determines that the printer start flag has not been set (NO in step F504), then in step F506, the CPU 201 simultaneously determines whether a scanner start flag has been set in the register of the interrupt controller 210.

If the CPU 201 determines that the scanner start flag has been set (YES in step F506), then in step F507, the CPU 201 cancels an operation wait signal of the scanner device 2. In the present exemplary embodiment, the scanner start flag has not been set (NO in step F506), and thus the CPU 201 does not cancel the operation wait signal of the scanner device 2.

If the CPU 201 determines that the scanner start flag has not been set (NO in step F506), then in step F508, the CPU 201 powers on the printer device 4 and the scanner device 2. In step F509, the CPU 201 causes the image forming apparatus 1 to return from sleep. In the present exemplary embodiment, the CPU 201 powers on only the printer device 4 in an operation wait cancelled state, to perform an initialization operation such as detection of sheets in a cassette stage for motor driving and rotation of a polygon mirror.

According to the present exemplary embodiment, when "print stored document" is performed at the time of return from sleep (S307), a period of time elapsed until the image forming apparatus 1 completes printing can be shortened because the image forming apparatus 1 powers on the printer device 4 in the operation wait cancelled state during return from sleep.

On the other hand, when an operation other than the "print stored document" is performed at the time of return from sleep, the image forming apparatus 1 completes printing as early as possible while being able to be silently started because the image forming apparatus 1 powers on the printer device 4 in the operation wait state during return from sleep.

The flow in the present exemplary embodiment can be used in not only the "print stored document" but also a similar operation using not a scanner but only a printer, for example, printing of a report. However, a content of the operation overlaps that of the operation using both the scanner and the printer, and hence description thereof is not repeated.

OTHER EMBODIMENTS

Additional embodiments can also be realized by a computer of a system or apparatus that reads out and executes computer executable instructions recorded on a storage medium (e.g., non-transitory computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-Ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

What is claimed is:

1. A printing apparatus, comprising:
a printer that includes one or more motors;
a print controller configured to drive the one or more motors;
a power controller configured to supply power to the print controller and stop power to the print controller;
a controller configured to select one screen among a plurality of screens as an initial screen to be displayed according to a sleep return instruction; and
a display,
wherein, in accordance with the sleep return instruction, (1) the display displays the one screen selected by the controller, (2) the power controller supplies power to the print controller, and (3) the print controller drives at least one of the one or more motors or not on a basis of a type of the one screen selected by the controller.

2. The printing apparatus according to claim 1,
wherein, in a case where a predetermined screen related to a print function is selected as the initial screen, in accordance with the sleep return instruction, the display displays the predetermined screen as the initial screen, the power controller supplies power to the print controller, and the print controller drives at least one of the one or more motors.

3. The printing apparatus according to claim 2,
wherein the predetermined screen related to the print function is at least one of a screen for setting copy conditions and a screen for selecting data to be printed.

4. The printing apparatus according to claim 1,
wherein the power controller outputs a predetermined signal to the print controller or not on a basis of the type of the one screen selected by the controller in accordance with the sleep return instruction, and
wherein the print controller drives at least one of the one or more motors in accordance with status of the predetermined signal.

5. The printing apparatus according to claim 4, further comprising:
a power supply source configured to output power to the print controller; and
a switch provided between the power supply source and the print controller,
wherein, in accordance with the sleep return instruction, the power controller
(1) outputs the predetermined signal to the print controller or not based on the type of the one screen selected by the controller, and
(2) turns on the switch.

6. The printing apparatus according to claim 5,
wherein the power controller turns on the switch after outputting the predetermined signal to the print controller.

7. The printing apparatus according to claim 1,
wherein a power system for power supply to the controller is different from a power system for the power supply to the print controller.

8. The printing apparatus according to claim 1,
wherein the motor is any of a motor for moving a polygon mirror, a motor for moving a drum, and a motor for moving a roller.

9. The printing apparatus according to claim 1,
wherein, in accordance with a power on instruction, the display displays the one screen selected by the controller, the power controller supplies power to the print controller and the print controller drives at least one of the one or more motors regardless of the one screen selected by the controller.

10. The printing apparatus according to claim 1, further comprising:
a scanner that includes one or more motors; and
a scan controller configured to drive the one or more motors of the scanner,
wherein the power controller further supplies power to the scan controller and stops power to the scan controller,
wherein, in accordance with a sleep return instruction, (1) the display displays the one screen selected by the controller, (2) the power controller supplies power to the scan controller, and (3) the scan controller drives the at least one of the one or more motors or not on a basis of the type of the one screen selected by the controller.

11. A reading apparatus, comprising:
a scanner that includes one or more motors; and
a scan controller configured to drive the one or more motors;
a power controller configured to supply power to the scan controller and stop power to the scan controller;
a controller configured to select one screen among a plurality of screens as an initial screen to be displayed according to a sleep return instruction; and
a display,
wherein, in accordance with the sleep return instruction, (1) the display displays the one screen selected by the controller, (2) the power controller supplies power to the scan controller, and (3) the scan drives at least the one or more motors or not on a basis of a type of the one screen selected by the controller.

12. The reading apparatus according to claim 11,
wherein, in a case where a predetermined screen related to a scan function is selected as the initial screen, in accordance with the sleep return instruction, the display displays the predetermined screen as the initial screen, the power controller supplies power to the scan controller, and the scan controller drives at least one of the one or more motors.

13. The reading apparatus according to claim 12,
wherein the predetermined screen related to the scan function is at least one of a screen for selecting a location for storing an image of a document scanned and a screen for specifying a destination of an image of a document scanned.

14. The reading apparatus according to claim 11,
wherein the power controller outputs a predetermined signal to the scan controller or not on a basis of the type of the one screen selected by the controller in accordance with the sleep return instruction, and
wherein the scan controller drives at least one of the one or more motors in accordance with status of the predetermined signal.

15. The reading apparatus according to claim 14, further comprising:
a power supply source configured to output power to the scan controller; and
a switch provided between the power supply source and the scan controller,
wherein, in accordance with the sleep return instruction, the power controller
(1) outputs the predetermined signal to the scan controller or not based on the type of the one screen selected by the controller, and
(2) turns on the switch.

16. The reading apparatus according to claim 15,
wherein the power controller turns on the switch after outputting the predetermined signal to the scan controller.

17. The reading apparatus according to claim 11,
wherein a power system for power supply to the setting unit is different from a power system for the power supply to the scan control unit.

18. The reading apparatus according to claim 11,
wherein the motor is any of a motor for conveying a document or a motor for adjusting a home position of a scanner head.

19. The reading apparatus according to claim 11,
wherein, in accordance with a power on instruction, the display displays the one screen selected by the controller, the power controller supplies power to the scan controller and the scan controller drives at least one of the one or more motors regardless of the one screen selected by the controller.

20. The reading apparatus according to claim 11,
a printer that includes one or more motors;
a print controller configured to drive the one or more motors of the printer,
wherein the power controller further supplies power to the print controller and stops power to the print controller,
wherein, in accordance with a sleep return instruction, (1) the display displays the one screen selected by the controller, (2) the power controller supplies power to the print controller, and (3) the print controller drives at least one of the one or more motors or not on a basis of the type of the one screen selected by the controller.

* * * * *